(12) United States Patent
Yang

(10) Patent No.: US 6,675,579 B1
(45) Date of Patent: Jan. 13, 2004

(54) HCCI ENGINE INTAKE/EXHAUST SYSTEMS FOR FAST INLET TEMPERATURE AND PRESSURE CONTROL WITH INTAKE PRESSURE BOOSTING

(75) Inventor: Jialin Yang, Canton, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 10/248,665

(22) Filed: Feb. 6, 2003

(51) Int. Cl.⁷ .............................. F02B 29/04; F02B 3/00
(52) U.S. Cl. .................... 60/599; 60/605.2; 60/611; 60/564; 123/27 R; 123/543; 123/336; 123/295; 123/435
(58) Field of Search ................. 60/605.2, 599, 60/611, 564, 302, 320; 123/295, 305, 27 R, 435, 294, 336, 543

(56) References Cited

U.S. PATENT DOCUMENTS

| | | | |
|---|---|---|---|
| 4,186,560 A | 2/1980 | Frankl | 60/599 |
| 4,385,496 A | 5/1983 | Yamane | |
| 5,036,668 A | 8/1991 | Hardy | 60/599 |
| 5,785,030 A * | 7/1998 | Paas | 60/605.2 |
| 5,974,802 A | 11/1999 | Blake | |
| 6,213,086 B1 * | 4/2001 | Chmela et al. | 123/27 R |
| 6,286,311 B1 | 9/2001 | Chen | |
| 6,295,973 B1 | 10/2001 | Yang | 123/543 |
| 6,363,721 B1 | 4/2002 | Prenninger et al. | |
| 6,568,179 B2 * | 5/2003 | Deeba | 60/320 |
| 2003/0047148 A1 * | 3/2003 | Unger et al. | 123/27 R |
| 2003/0056736 A1 * | 3/2003 | Unger et al. | 123/27 R |
| 2003/0145836 A1 * | 8/2003 | Linna et al. | 123/27 R |

FOREIGN PATENT DOCUMENTS

| | | | | |
|---|---|---|---|---|
| JP | 04058033 A * | 2/1992 | | 123/336 |
| JP | 05052129 A * | 3/1993 | | 123/336 |

OTHER PUBLICATIONS

SAE paper #s 2001-01-1031, 2001-01-1896 and 2001-01-1897.

* cited by examiner

Primary Examiner—Thomas Denion
Assistant Examiner—Thai-Ba Trieu

(57) ABSTRACT

An intake/exhaust system and a method of controlling intake air temperature and pressure for a dual-mode homogeneous charge compression ignition (HCCI) engine is provided. The system may include an air compressor including at least two output air flow paths, an intercooler for cooling air from one of the air flow paths, and heat exchangers for heating air from another one of the air flow paths. Control valves may be provided for controlling the mass ratio of air through the air flow paths to thereby control temperature and pressure of air supplied to the engine. The first air flow path may direct air to the engine via the intercooler and the second air flow path may direct air to the engine via the heat exchangers, whereby, air at first and second controlled temperatures and pressures may be supplied to the engine for operation in SI and HCCI modes.

20 Claims, 6 Drawing Sheets

HCCI ENGINE INTAKE/EXHAUST SYSTEMS FOR FAST INLET TEMPERATURE AND PRESSURE CONTROL WITH INTAKE PRESSURE BOOSTING

BACKGROUND OF INVENTION a. Field of Invention

The invention relates generally to intake and exhaust systems for engines, and, more particularly to an intake and exhaust system for a dual mode HCCI engine, which provides superior intake temperature and pressure control for engine operation in SI and HCCI modes.

b. Description of Related Art

Compared to conventional engines, homogeneous charge compression ignition (HCCI) engines potentially have high efficiency, very low emissions of oxides of nitrogen (NOx) and particulates, and relatively low cost. HCCI engines however must operate over the same operating range, in terms of speed and torque, as conventional SI or diesel engines. Because HCCI is limited by harsh combustion at higher torques, it is common for the engine to employ both SI and HCCI combustion mode technology. At medium torque, the engine can operate in HCCI mode to achieve high fuel efficiency and low NOx emissions. At higher torques however, combustion mode of the engine may be switched to SI mode.

For an HCCI engine with a limited compression ratio, the intake temperature in HCCI mode should preferably be high enough for auto-ignition. In other words, the lower the torque, the higher the intake temperature should preferably be. The air-fuel mixture for a dual combustion engine in HCCI mode is diluted by air or by exhaust gas recirculation (EGR) through the use of high intake pressure (i.e. unthrottled operation at medium torque) to suppress NOx formation. In contrast, the intake temperature of a dual combustion engine in SI mode should preferably be low enough (i.e. close to the ambient temperature) to avoid knocking, and the air-fuel mixture should preferably be at, or close to, stoichiometric. Thus, when a dual combustion engine is switching from HCCI mode to SI mode, the inlet temperature should preferably decrease quickly and the intake pressure should preferably also decrease quickly to restrict the intake airflow to form a stoichiometric mixture at a medium torque.

A good control of the intake pressure can also improve dual combustion engine performance under some special conditions. At idle, when the dual combustion engine is operating in HCCI mode, the engine may be throttled to control the air-fuel ratios to below 80:1, which can increase the exhaust gas temperatures and reduce CO emissions. At the high-torque boundary of the HCCI operating region, boosting the intake pressure can dilute the mixture to reduce NOx emissions and to control the combustion rate, thus expanding the HCCI region to higher torques. In SI mode, boosting the intake pressure at high torques can provide higher torque output. This feature is especially important if the dual combustion engine has a fixed geometric compression ratio higher than those for conventional SI engines. This is because boosting the intake pressure can compensate the loss in volumetric efficiency, due to the reduced effective compression ratio (for avoiding knock). In SI mode, the compressed intake air should preferably be cooled down by an intercooler to control engine knock. In contrast, cooling the compressed intake air is not necessary during the HCCI mode.

Accordingly, the intake/exhaust system for a dual-mode HCCI engine can be relatively complicated, as evidenced by the aforementioned description.

Various related-art intake/exhaust systems for HCCI engines are known and disclosed, for example, in U.S. Pat. No. 6,295,973 to Yang (Yang), and SAE paper Nos. 2001-01-1031, 2001-01-1896 and No. 2001-01-1897.

U.S. Pat. No. 6,295,973 to Yang, the disclosure of which is incorporated herein by reference, discloses an intake system for an HCCI engine, which proposes using the waste thermal energy in the coolant and exhaust gases to heat the intake air and control the intake air temperature by mixing the heated and un-heated air streams with different mass ratios of the two air streams. Additionally, SAE paper Nos. 2001-01-1031, 2001-01-1896 and No. 2001-01-1897 disclose an HCCI engine intake system with a turbocharger, an intercooler, and heaters, and HCCI engine intake systems with supercharging or turbo These related-art references however do not provide fast intake temperature and pressure control for SI and HCCI operations of a dual-mode HCCI engine.

Accordingly, there remains a need for an intake and exhaust system for a dual-mode HCCI engine, which achieves fast intake temperature and pressure control for engine operation in both the SI and the HCCI modes, which is structurally and economically feasible to manufacture and install, and which efficiently and reliably achieves the required temperature and pressure characteristics for the relatively complicated operation of the dual-mode HCCI engine.

SUMMARY OF INVENTION

The invention solves the problems and overcomes the drawbacks and deficiencies of prior art intake and exhaust systems by providing a novel method and apparatus for controlling intake air temperature and pressure in a dual-mode HCCI engine.

Thus, an aspect of the present invention is to provide fast control of the intake air temperature and pressure incorporated with intake pressure boosting.

Another aspect of the present invention is to provide an intake/exhaust system and control method thereof for allowing quick variation of the intake air temperature and intake air pressure, while allowing boosting of the air temperature and pressure above ambient conditions.

Specifically, the invention provides an intake/exhaust system for a dual-mode homogeneous charge compression ignition (HCCI) engine having intake and exhaust manifolds. The system may include an air compressor for boosting intake pressure of air supplied to the engine and including at least two output air flow paths. The system may further include an intercooler for cooling air from a first one of the air flow paths, at least one heat exchanger for heating air from a second one of the air flow paths, and control valves for controlling the mass ratio of air through the air flow paths to thereby control temperature and pressure of air supplied to the engine. In this manner, the first air flow path may direct air to the engine via the intercooler and the second air flow path may direct air to the engine via the heat exchanger, such that air at a first temperature is supplied to the engine for operation in SI mode and air at a second temperature is supplied to the engine for operation in HCCI mode.

For the system described above, the air compressor may be a supercharger, an E-booster (i.e., air compressor driven by an electric motor), or a turbocharger. For the supercharger, a pressure release valve operable to control pressure downstream of the supercharger may be provided. For the E-booster, a bypass valve operable to control pressure downstream of the E-booster may be provided. The bypass valve may be closed upon activation of the E-booster and open upon deactivation of the E-booster. A catalyst may be disposed between the engine exhaust manifold and one of the heat exchangers. For the turbocharger, an exhaust bypass valve may be provided, located downstream of the turbocharger, operable in conjunction with an intake bypass valve, located upstream of the turbocharger, for controlling operation of the turbocharger. An exhaust gas recirculation (EGR) line may be provided for directing exhaust gas from an exhaust heat exchanger to the air compressor, and may include an EGR control valve for controlling the flow of exhaust gas through the EGR line.

The invention also provides an intake/exhaust system for a dual-mode homogeneous charge compression ignition (HCCI) engine including intake and exhaust manifolds. The system may include an air compressor for boosting intake pressure of air supplied to the engine and include at least two output air flow paths. The system may further include an intercooler for cooling air from a first one of the air flow paths, at least one heat exchanger for heating air from a second one of the air flow paths, and a throttle for controlling flow of air from the intercooler to engine cylinders. In this manner, the first air flow path may direct air to the engine via the intercooler and the second air flow path may direct air to the engine via the heat exchanger, such that air at a first temperature is supplied to the engine for operation in SI mode and air at a second temperature is supplied to the engine for operation in HCCI mode.

For the system described above, three-way control valves may be provided for controlling the mass ratio of air through the throttle to thereby control temperature and pressure of air supplied to the engine. Each of the three way valves may include two input air flow paths and one output air flow path for supplying air to the engine. One of the input air flow paths may receive air controlled by the throttle, the other one of the input air flow paths may receive air from the heat exchanger.

Alternatively, for an engine including at least two intake valves and at least one exhaust valve, the system may include at least one variable valve timing device for controlling at least one of the intake valves to control the mass ratio of air supplied to the intake valves to thereby control temperature and pressure of air supplied to the engine. A first variable valve timing device may control a first intake valve, thereby controlling the supply of air through the throttle to the first intake valve. A second variable valve timing device may control a second intake valve, thereby controlling the supply of air through the heat exchanger to the second intake valve. Alternatively, the system may include at least one port throttle for controlling air flow to at least one of the intake valves to control the mass ratio of air supplied to the intake valves to thereby control temperature and pressure of air supplied to the engine. A first port throttle may control air flow to a first intake valve, thereby controlling the supply of air through the throttle to the first intake valve. A second port throttle may control air flow to a second intake valve, thereby controlling the supply of air through the heat exchanger to the second intake valve.

In another configuration, the system may include at least one additional throttle for controlling air flow to each of the intake valves to control the mass ratio of air supplied to the intake valves to thereby control temperature and pressure of air supplied to the engine. The additional throttle may control air flow through the second air flow path. Thereafter, air within the first and second air flow paths may be mixed and supplied to the intake valves. Alternatively, the additional throttle may control air flow to one of the intake valves to control air supplied to the intake valve and to thereby control temperature and pressure of air supplied to the engine. The additional throttle may control air flow through the second air flow path. Thereafter, air within the first air flow path may be directly supplied to another one of the intake valves.

The invention further provides a method of controlling intake air temperature and pressure in a dual-mode homogeneous charge compression ignition (HCCI) engine having intake and exhaust manifolds. The method may include supplying air to the engine via at least two air flow paths, cooling air in one of the air flow paths and heating air in another one of the air flow paths. The method may further include controlling the mass ratio of air through the air flow paths to thereby control temperature and pressure of air supplied to the engine, and boosting intake pressure of air supplied to the engine. In this manner, air at a first temperature may be supplied to the engine for operation SI mode and air at a second temperature may be supplied to the engine for operation in HCCI mode.

The method described above may further include utilizing a supercharger for compressing air supplied to the engine and thereby boosting intake pressure of air supplied to the engine, and controlling pressure downstream of the supercharger by means of a pressure release valve. Alternatively, the method may include utilizing an E-booster for compressing air supplied to the engine and thereby boosting intake pressure of air supplied to the engine, and controlling pressure downstream of the E-booster by means of a bypass valve. The bypass valve may be closed upon activation of the E-booster and opened upon deactivation of the E-booster. Alternatively, the method may include utilizing a turbocharger for compressing air supplied to the engine and thereby boosting intake pressure of air supplied to the engine. The method may further include controlling operation of the turbocharger by means of an exhaust bypass valve, located downstream of the turbocharger, operable in conjunction with an intake bypass valve, located upstream of the turbocharger.

The method may further include directing exhaust gas from an exhaust heat exchanger to an air compressor via an exhaust gas recirculation (EGR) line, and controlling flow of exhaust gas through the EGR line by means of an EGR control valve.

In another embodiment, the method may include controlling flow of cooled air by means of a throttle, and controlling the mass ratio of air through the throttle by means of a plurality of three-way control valves to thereby control temperature and pressure of air supplied to the engine. Each of the three way control valves may include two input air flow paths and one output air flow path for supplying air to the engine. One of the input air flow paths may receive air controlled by the throttle, the other one of the input air flow paths may receive air from a heat exchanger.

In yet another embodiment, the method may include controlling flow of cooled air by means of a throttle, and controlling the mass ratio of air supplied to at least one of the intake valves by means of at least one variable valve timing device to thereby control temperature and pressure of air supplied to the engine. A first variable valve timing device may control a first intake valve, thereby controlling the supply of air through the throttle tho the first intake valve.

A second variable valve timing device may control a second intake valve, thereby controlling the supply of air through a heat exchanger to the second intake valve. Alternatively, the method may include controlling flow of cooled air by means of a throttle, and controlling the mass ratio of air supplied to at least one of the intake valves by means of at least one port throttle to thereby control temperature and pressure of air supplied to the engine. A first port throttle may control flow past a first intake valve, thereby controlling the supply of air through the throttle to the first intake valve. A second port throttle may control flow past a second intake valve, thereby controlling the supply of air through a heat exchanger to the second intake valve.

Additional features, advantages, and embodiments of the invention may be set forth or apparent from consideration of the following detailed description, drawings, and claims. Moreover, it is to be understood that both the foregoing summary of the invention and the following detailed description are exemplary and intended to provide further explanation without limiting the scope of the invention as claimed.

BRIEF DESCRIPTION OF DRAWINGS

The accompanying drawings, which are included to provide a further understanding of the invention and are incorporated in and constitute a part of this specification, illustrate preferred embodiments of the invention and together with the detail description serve to explain the principles of the invention. In the drawings.

DETAILED DESCRIPTION

Figure 1:
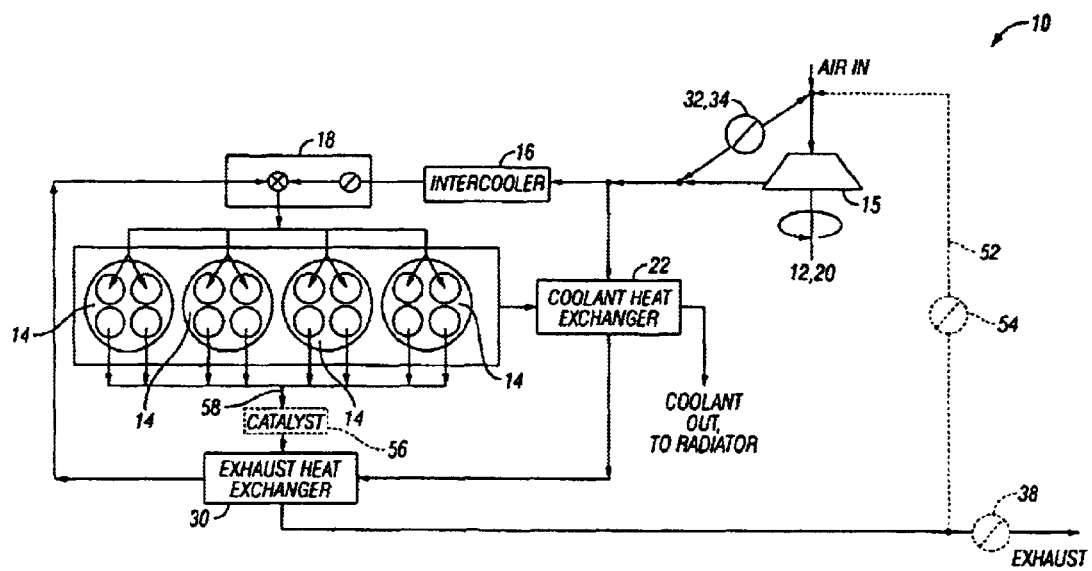
FIG. 1 is a schematic block diagram of a first embodiment of an intake/exhaust system with intake heating, inlet temperature and pressure controls, and intake air pressure boost using a supercharger or an E-booster.

Referring now to the drawings wherein like reference numerals designate corresponding parts throughout the several views, FIGS. 1–6 illustrate components of an intake/exhaust system according to the present invention, generally designated 10.

Figure 2:
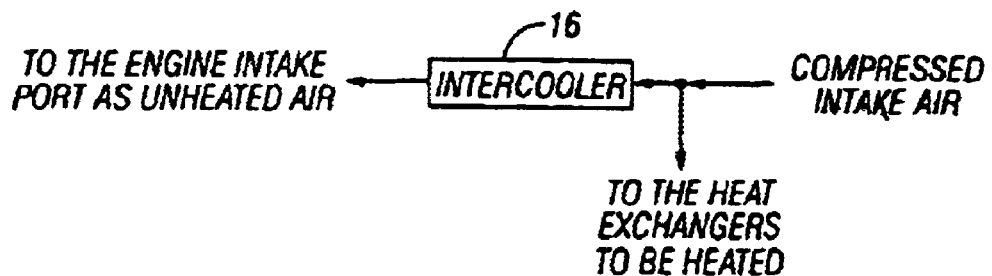
FIG. 2 is a layout of an intake air flow arrangement.
Figure 3A:
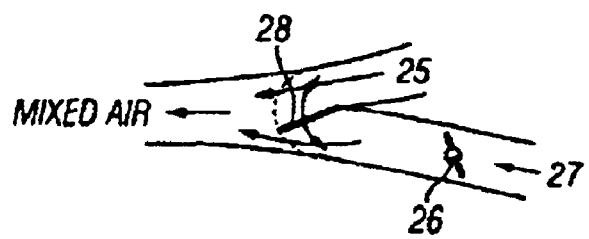
FIGS. 3A and 3B illustrate two options for intake air temperature and intake pressure (or air flow rate) control.
Figure 3B:
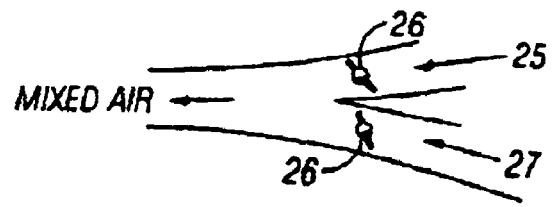

Referring to FIG. 1, a first embodiment of intake/exhaust system 10 with intake heating, inlet temperature and pressure controls, and intake air pressure boost using a supercharger 12 or an E-booster, are disclosed. For the embodiment of FIG. 1, the compressed intake air via air compressor 15 may include two flow paths (or routes) to engine cylinders 14, as shown in FIG. 2. The first path may be through an intercooler 16, and then to control valves 18 and engine cylinders 14. Airflow through this path would be unheated air. The second path may be through coolant heat exchanger 22 and exhaust heat exchanger 30, and then to control valves 18 and engine cylinders 14. Airflow through this path would be heated air. The arrangement of air through either intercooler 16 or through coolant heat exchanger 22 and exhaust heat exchanger 30 would allow low intake temperature operation in SI mode to avoid knocking, and would reserve the thermal energy in the compressed air for HCCI combustion. The mass ratio of the heated and unheated air streams to control valves 18 and engine cylinders 14 may also be varied to control the intake air temperature.

The intake air pressure may be controlled using conventional control valves and air compressor 15. For example, referring to FIG. 3, flow cross-sections of the hot and cold air streams 25 and 27, respectively, may be varied by using valves 26 and 28 in FIG. 3A, or valves 26 in FIG. 3B, to thereby control the airflow rates, and intake pressure and temperature in the intake ports. Those skilled in the art will appreciate in view of this disclosure that other control valve designs may be employed to control the intake air pressure, as would be apparent to a skilled artisan.

Referring to FIG. 1, if a supercharger 12 is used (i.e. air compressor 15 is mechanically driven by the engine), a pressure release valve 32 may be used and opened when boosting is not needed to control the pressure downstream of supercharger 12. As discussed above, if instead of a supercharger 12 an E-booster is used (i.e. air compressor 15 is driven by an electrical motor), instead of pressure release valve 32, a bypass valve 34 may be used for opening when boosting is not in need and when E-booster is deactivated. Bypass valve 34 may preferably open simultaneously with the deactivation of E-booster 20, and likewise, close simultaneously with the activation of E-booster 20.

Intake/exhaust system 10 of FIG. 1 may optionally employ an exhaust gas recirculation (EGR) line 52 and EGR control valve 54. A catalyst 56 may be placed between the engine exhaust port 58 and heat exchanger 30.

For some HCCI engines, a large valve overlap (i.e. the overlap of the intake and exhaust events) is used during HCCI operation. During the application of intake pressure boosting near the high-torque boundary of the HCCI operating region, some fresh air in engine cylinders 14 may flow out to the exhaust port due to the pressure difference. To minimize the associated losses due to such fresh airflow to the exhaust port, the valve overlap may preferably be minimized for applications requiring intake pressure boosting. Alternatively, an exhaust backpressure control valve 38, as shown in FIG. 1, may be applied to raise the exhaust pressures and minimize the loss of fresh air in engine cylinders 14.

Figure 4:
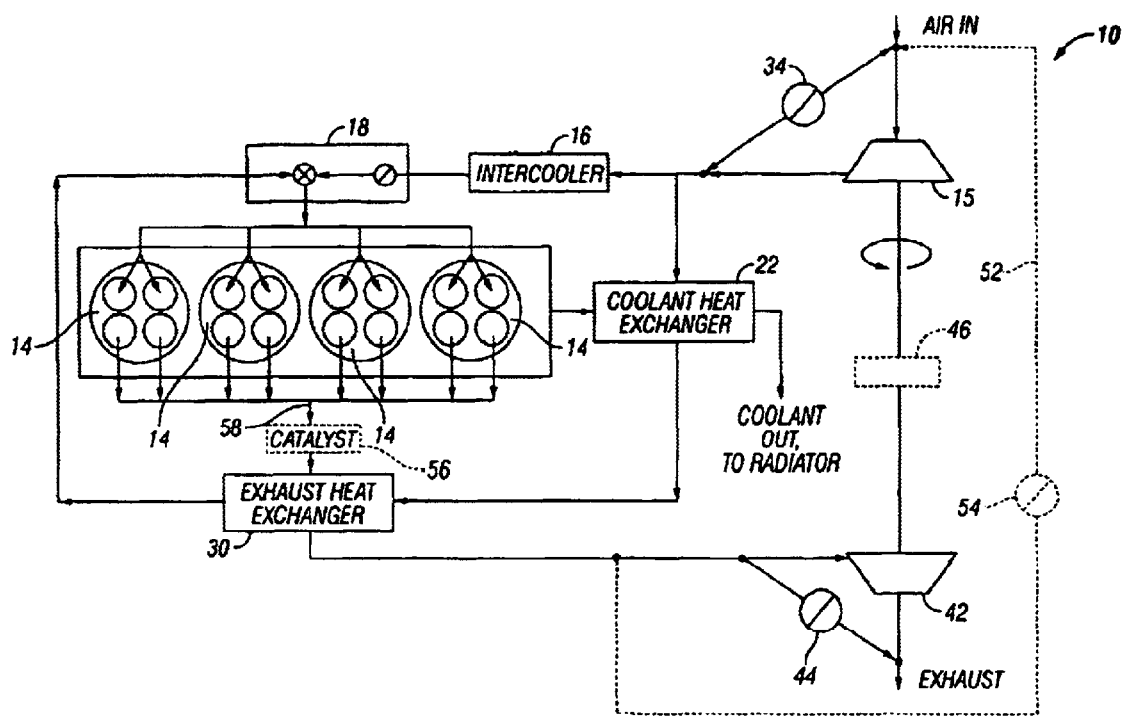
FIG. 4 is a schematic block diagram of a second embodiment of an intake/exhaust system, similar to the system illustrated in FIG. 1, except using a turbocharger.

FIG. 4 illustrates a second embodiment of an intake/exhaust system 10 according to the present invention.

Referring to FIG. 4, for the second embodiment of an intake/exhaust system 10, as discussed above, for FIG. 1, the compressed intake air via air compressor 15 may include two flow paths (or routes) to engine cylinders 14. The first path may be through an intercooler 16, and then to control valves 18 and engine cylinders 14. Airflow through this path would be unheated air. The second path may be through coolant heat exchanger 22 and exhaust heat exchanger 30, and then to control valves 18 and engine cylinders 14. Airflow through this path would be heated air.

For the embodiment of FIG. 4, fresh air loss may be minimized by using a gas turbine 42 to drive air compressor 15 (i.e. by a turbocharger). The use of gas turbine 42 would also eliminate the use of backpressure valve 38 of FIG. 1. A bypass of gas turbine 42 with an exhaust bypass valve 44 may be used as illustrated in FIG. 4. Generally, intake bypass valve 34 and exhaust bypass valve 44 preferably open and close simultaneously to control the operation of gas turbine 42, based upon the required boosting. If the energy in the exhaust gases is insufficient to drive air compressor 15, an electrical motor 46 may be used to assist drive of gas turbine 42 and to improve the response thereof. When electrical motor 46 is used, a unique control strategy may be applied to improve full torque operation in Si mode. In such a case, exhaust bypass valve 44 may partially open to create some scavenging to reduce the hot residuals and the cylinder temperature.

As discussed above for FIG. 1, intake/exhaust system 10 of FIG. 4 may optionally employ an EGR line 52 and EGR control valve 54. A catalyst 56 may be placed between the engine exhaust port 58 and heat exchanger 30.

Figure 5A:
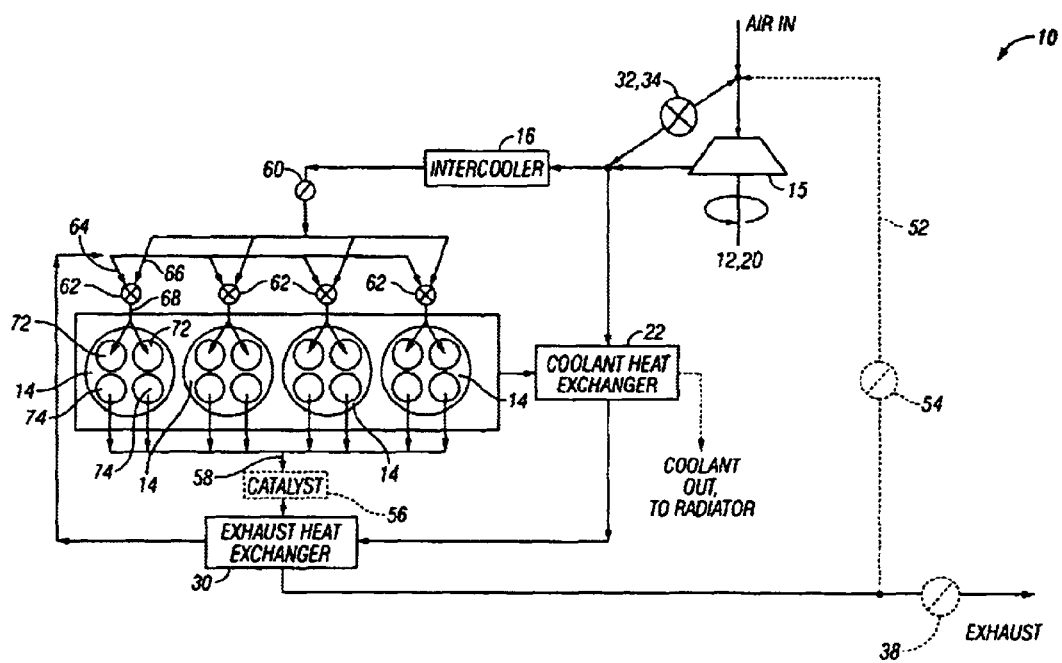
FIG. 5A is a schematic block diagram of a third embodiment of an intake/exhaust system for improving the response of intake air temperature control and for cylinder-to-cylinder balancing.
Figure 6:
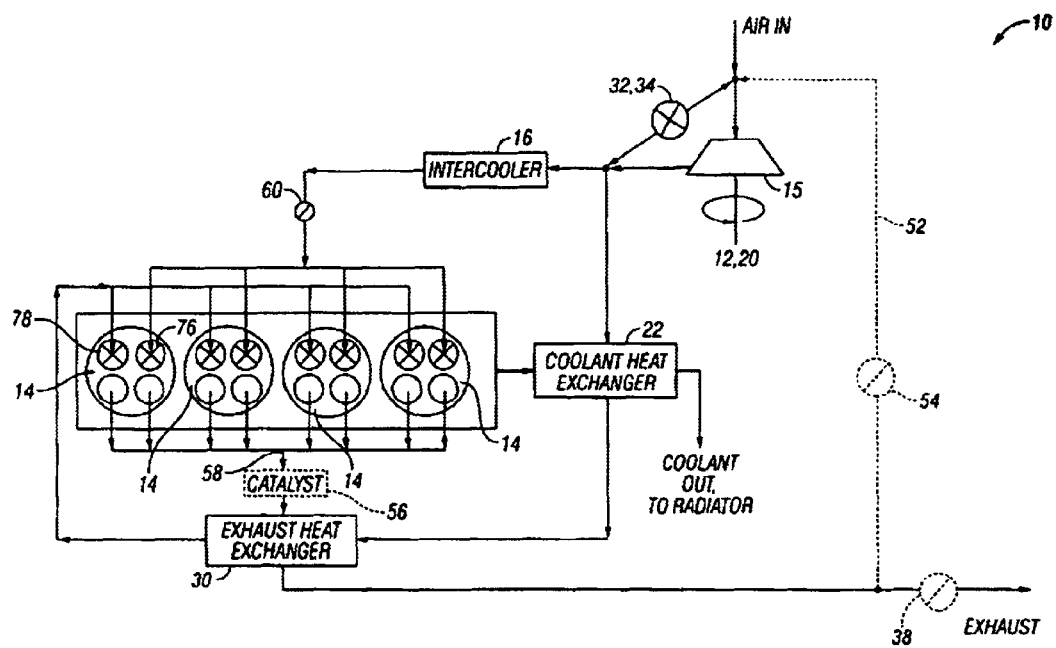
FIG. 6 is a schematic block diagram of a fourth embodiment of an intake/exhaust system for improving the response of both the intake air temperature control and the trapped air mass (air flow rate) control, and for cylinder-to-cylinder balancing.

FIGS. 5A and 6 illustrate third and fourth embodiments, respectively, of intake/exhaust system 10 according to the present invention.

Specifically, the third embodiment of intake/exhaust system 10 of FIG. 5A provides improvement in the response of intake air temperature control and cylinder-to-cylinder balancing. The fourth embodiment of intake/exhaust system 10 of FIG. 6 provides improvement in the response of both the intake air temperature control and the trapped air mass (air flow rate) control, and cylinder-to-cylinder balancing of the intake air temperature and the trapped air mass.

For the third and fourth embodiments of FIGS. 5A and 6, respectively, as discussed above for FIG. 1, intake air pressure may be boosted using a supercharger 12 or an E2. The compressed intake air via air compressor 15 may include two flow paths (or routes) to engine cylinders 14. The first path may be through an intercooler 16, and then to throttle 60 and engine cylinders 14. Airflow through this path would be unheated air. The second path may be to coolant heat exchanger 22 and exhaust heat exchanger 30, and then through throttle 60 and engine cylinders 14. Airflow through this path would be heated air.

Referring to FIG. 5A, for the third embodiment of intake/exhaust system 10, a plurality of three-way control valves 62 may be used for controlling the mass ratio of air through throttle 60 to thereby control temperature and pressure of air supplied to engine cylinders 14. In the exemplary embodiment of FIG. 5A, each cylinder 14 may include dual intake and exhaust valves 72 and 74, respectively. Each three way control valve 62 may include two input air flow paths 64 and 66, and one output air flow path 68 for supplying air to engine cylinders 14. Input air flow paths 64 and 66 may be respectively connected to the output of exhaust heat exchanger 30 and, throttle 60 (via intercooler 16). Accordingly, input air flow paths 64 and 66 may supply heated and cooled air, respectively. Output air flow path 68 would therefore supply air at a predetermined temperature and pressure as needed for SI or HCCI operation. The third embodiment of intake/exhaust system 10 of FIG. 5A would therefore provide an improved response of intake air temperature control and cylinder-to-cylinder balancing of engine cylinders 14.

Referring to FIG. 6, for the fourth embodiment of intake/exhaust system 10, instead of the three-way control valves 62 of the third embodiment, throttled air via intercooler 16 may be directly supplied to intake valves 76. Moreover, heated air via exhaust heat exchanger 30 may be directly supplied to intake valves 78. The mass ratio of the cooled and heated air streams may be controlled by utilizing variable valve timing devices (not shown) or port throttles (not shown) for controlling air flow to intake valves 76 and 78. The fourth embodiment of intake/exhaust system 10 of FIG. 6 would therefore provide an improved response of intake air temperature control, the trapped air mass (air flow rate) control, and cylinder-to-cylinder balancing of engine cylinders 14.

For the third and fourth embodiments of FIGS. 5A and 6, respectively, if a supercharger 12 is used, a pressure release valve 32 may be used for opening when boosting is not needed to control the pressure downstream of supercharger 12. If instead of a supercharger 12 an E-booster is used, instead of pressure release valve 32, a bypass valve 34 may be used for opening when boosting is not needed and when boost is deactivated. Bypass valve 34 may preferably open simultaneously with the deactivation of E-booster, and likewise, close simultaneously with the activation of E-booster 20.

As discussed above for the second embodiment of FIG. 4, the above-identified intake/exhaust system 10 of FIGS. 5A and 6 may optionally employ an EGR line 52 and EGR control valve 54. A catalyst 56 may be placed between the engine exhaust port 58 and heat exchanger 30.

Figure 5B:
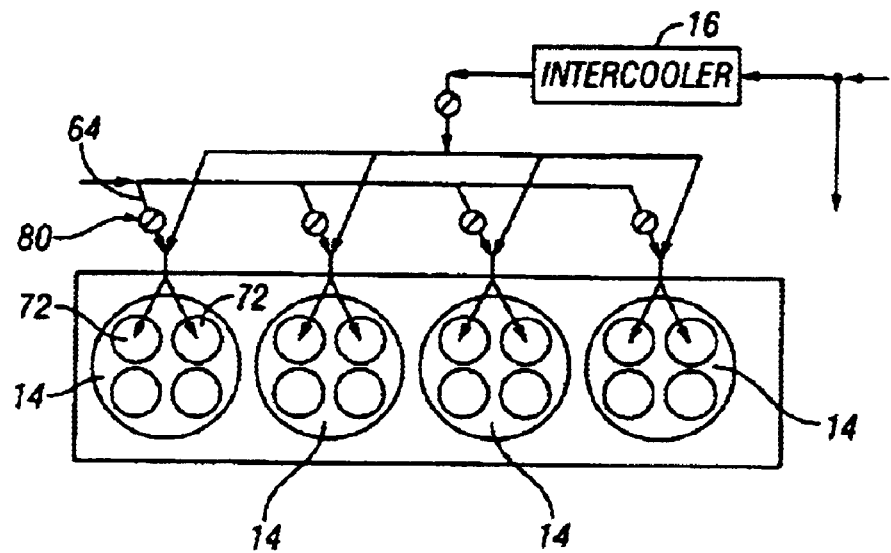
FIG. 5B is a schematic block diagram of an alternative configuration of the third embodiment of FIG. 5A.
Figure 5C:
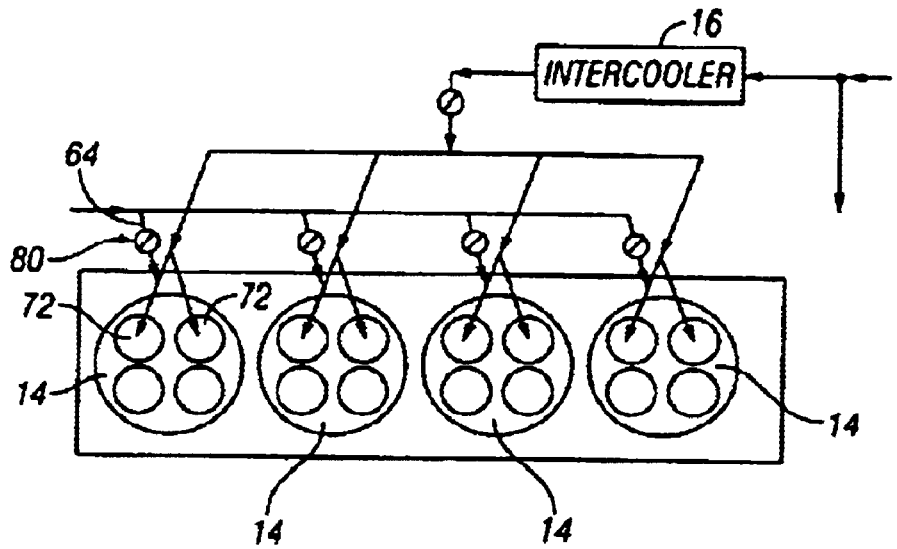
FIG. 5C is a schematic block diagram of yet another an alternative configuration of the third embodiment of FIG. 5A.

Referring now to FIGS. 5B and 5C, schematic block diagrams of alternative configurations of the third embodiment of FIG. 5A are illustrated. As shown in FIG. 5B, instead of the three-way control valves 62 of FIG. 5A, throttles 80 may be used to control heated air flow through input air flow path 64, which supplies heated air via exhaust heat exchanger 30. The mixed streams of heated and cooled air (via intercooler 16) may be uniformly distributed past intake valves 72. For the configuration of FIG. 5C, instead of the three-way control valves 62 of FIG. 5A, throttles 80 may be used to control heated air flow through input air flow path 64, which supplies heated air via exhaust heat exchanger 30. For the configuration of FIG. 5C, the heated stream of air via exhaust heat exchanger 30 may be directly supplied to one of the intake valves 72, instead of being pre-mixed with cooled air (via intercooler 16), as illustrated for the configuration of FIG. 5B.

It should be noted that as discussed above for the second embodiment of FIG. 4, for the embodiments of FIGS. 5A, 5B, 5C and 6, fresh air loss may be minimized by using a gas turbine 42 to drive air compressor 15 (i.e. by a turbocharger). The concepts and principles of the first through fourth embodiments of intake/exhaust system 10 may be applied in both in-line engines and V-arrangement engines. Moreover, it should be noted that the cylinder and valve arrangements of FIGS. 1, 4, 5A–C and 6 are only shown for illustrative purposes, and are not intended to limit the application of the present invention to a specific engine type or arrangement.

Although particular embodiments of the invention have been described in detail herein with reference to the accompanying drawings, it is to be understood that the invention is not limited to those particular embodiments, and that various changes and modifications may be effected therein by one skilled in the art without departing from the scope or spirit of the invention as defined in the appended claims.

What is claimed is:

1. An intake/exhaust system for a dual-mode homogeneous charge compression ignition (HCCI) engine having intake and exhaust manifolds, said system comprising:

an air compressor for boosting intake pressure of air supplied to the engine and including at least two output air flow paths;

an intercooler for cooling air from a first one of said air flow paths; at least one heat exchanger for heating air from a second one of said air flow paths; and a plurality of control valves for controlling a mass ratio of air through said air flow paths to thereby control temperature and pressure of air supplied to the engine, wherein said first air flow path directs air to the engine via said intercooler and said second air flow path directs air to the engine via said heat exchanger, such that air at a first temperature is supplied to the engine for operation in SI mode and air at a second temperature is supplied to the engine for operation in HCCI mode.

2. The system according to claim 1, said air compressor being a supercharger, said system further comprising:

a pressure release valve operable to control pressure downstream of said supercharger.

3. The system according to claim 1, said air compressor being an E-booster.

4. The system according to claim 1, further comprising:

a catalyst disposed between the engine exhaust manifold and one of said heat exchangers.

5. The system according to claim 1, said air compressor being a turbocharger, said system further comprising:

an exhaust bypass valve, located downstream of said turbocharger, operable in conjunction with an intake bypass valve, located upstream of said turbocharger, for controlling operation of said turbocharger.

6. The system according to claim 1, further comprising:

an exhaust gas recirculation (EGR) line for directing exhaust gas from an exhaust heat exchanger to said air compressor; and an EGR control valve for controlling the flow of exhaust gas through said EGR line.

7. An intake/exhaust system for a dual-mode homogeneous charge compression ignition (HCCI) engine including intake and exhaust manifolds, said system comprising:

an air compressor for boosting intake pressure of air supplied to the engine and including at least two output air flow paths;

an intercooler for cooling air from a first one of said air flow paths;

at least one heat exchanger for heating air from a second one of said air flow paths; and a throttle for controlling flow of air from said intercooler to engine cylinders, wherein said first air flow path directs air to the engine via said intercooler and said second air flow path directs air to the engine via said heat exchanger, such that air at a first temperature is supplied to the engine for operation in SI mode and air at a second temperature is supplied to the engine for operation in HCCI mode.

8. The system according to claim 7, further comprising:

a plurality of three-way control valves for controlling a mass ratio of air through said throttle to thereby control temperature and pressure of air supplied to the engine, each of said three way valves including two input air flow paths and one output air flow path for supplying air to the engine, one of said input air flow paths receiving air controlled by said throttle, the other one of said input air; flow paths receiving air from said heat exchanger.

9. The system according to claim 7, with each cylinder of the engine including at least two intake valves and at least one exhaust valve, said system further comprising:

at least one variable valve timing device for controlling at least one of the intake valves to control a mass ratio of air supplied to the intake valves to thereby control temperature and pressure of air supplied to the engine, a first one of said variable valve timing devices controlling a first intake valve, thereby controlling the supply of air through said throttle to the first intake valve, and a second one of said variable valve timing devices controlling a second intake valve, thereby controlling the supply of air through said heat exchanger to the second intake valve.

10. The system according to claim 7, with each cylinder of the engine including at least two intake valves and at least one exhaust valve, said system further comprising:

at least one port throttle for controlling air flow to at least one of the intake valves to control a mass ratio of air supplies to the intake valves to thereby control temperature and pressure of air supplied to the engine, a first one of said port throttles controlling air flow to a first intake valve, thereby controlling the supply of air through said throttle to the first intake valve, and a second one of said port throttles controlling air flow to a second intake valve, thereby controlling the supply of air through said heat exchanger to the second intake valve.

11. The system according to claim 7, with each cylinder of the engine including at least two intake valves and at least one exhaust valve, said system further comprising:

at least one additional throttle for controlling air flow to each of the intake valves to control a mass ratio of air supplied to the intake valves to thereby control temperature and pressure of air supplied to the engine, wherein said additional throttle controls air flow through said second air flow path, air within said first and second air flow paths is mixed and supplied to the intake valves.

12. The system according to claim 7, with each cylinder of the engine including at least two intake valves and at least one exhaust valve, said system further comprising:

at least one additional throttle for controlling air flow to one of the intake valves to control air supplied to the intake valve and to thereby control temperature and pressure of air supplied to the engine, wherein said additional throttle controls air flow through said second air flow path, air within said first air flow path is directly supplied to another one of the intake valves.

13. A method of controlling intake air temperature and pressure in a dual-mode homogeneous charge compression ignition (HCCI) engine having intake and exhaust manifolds, said method comprising:

supplying air to the engine via at least two air flow paths;

cooling air in one of said air flow paths;

heating air in another one of said air flow paths;

controlling a mass ratio of air through said air flow paths to thereby control temperature and pressure of air supplied to the engine; and boosting intake pressure of air supplied to the engine, whereby air at a first temperature being supplied to the engine for operation in SI mode and air at a second temperature being supplied to the engine for operation in HCCI mode.

14. The method according to claim 13, further comprising:

utilizing a supercharger for compressing air supplied to the engine and thereby boosting intake pressure of air supplied to the engine; and controlling pressure downstream of said supercharger by means of a pressure release valve.

15. The method according to claim 13, further comprising:

utilizing an E-booster for compressing air supplied to the engine and thereby boosting intake pressure of air supplied to the engine.

16. The method according to claim 13, further comprising:

utilizing a turbocharger for compressing air supplied to the engine and thereby boosting intake pressure of air supplied to the engine; and controlling operation of said turbocharger by means of an exhaust bypass valve, located downstream of said turbocharger, operable in conjunction with an intake bypass valve, located upstream of said turbocharger.

17. The method according to claim 13, further comprising:

directing exhaust gas from an exhaust heat exchanger to an air compressor via an exhaust gas recirculation (EGR) line; and controlling flow of exhaust gas through said EGR line by means of an EGR control valve.

18. The method according to claim 13, further comprising:

controlling flow of cooled air by means of a throttle; and controlling a mass ratio of air through said throttle by means of a plurality of three-way control valves to thereby control temperature and pressure of air supplied to the engine, each of said three way control valves including two input air flow paths and one output an flow path for supplying air to the engine, one of said input air flow paths receiving air controlled by said throttle, the other one of said input air flow paths receiving air from a heat exchanger.

19. The method according to claim 13, with each cylinder of the engine including at least two intake valves and at least one exhaust valve, said method further comprising:

controlling flow of cooled air by means of a throttle; and controlling a mass ratio of air supplied to at least one of the intake valves by means of at least one variable valve timing device to thereby control temperature and pressure of air supplied to the engine, and by a first variable valve timing device controlling a first intake valve, thereby controlling the supply of air through said throttle to the first intake valve, and by a second variable valve timing device controlling a second intake valve, thereby controlling the supply of air through a heat exchanger to the second intake valve.

20. The method according to claim 13, with each cylinder of the engine including at least two intake valves and at least one exhaust valve, said method further comprising:

controlling flow of cooled air by means of a throttle; and controlling a mass ratio of air supplied to at least one of the intake valves by means of at least one port throttle to thereby control temperature and pressure of air supplied to the engine, a first port throttle controlling flow past a first intake valve, thereby controlling the supply of air through said throttle to the first intake valve, and a second port throttle controlling flow past a second intake valve, thereby controlling the supply of air through a heat exchanger to the second intake valve.

* * * * *